United States Patent
Wu et al.

(10) Patent No.: US 12,132,236 B2
(45) Date of Patent: Oct. 29, 2024

(54) SUPPLEMENTAL COOLING SYSTEMS FOR FUEL CELL POWERED VEHICLES WITH LIQUID HYDROGEN

(71) Applicant: International Engine Intellectual Property Company, LLC, Lisle, IL (US)

(72) Inventors: Shouhao Wu, South Barrington, IL (US); Grzegorz Siuchta, Des Plaines, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 220 days.

(21) Appl. No.: 17/703,971

(22) Filed: Mar. 24, 2022

(65) Prior Publication Data

US 2023/0307669 A1    Sep. 28, 2023

(51) Int. Cl.
*H01M 8/04029* (2016.01)
*F25B 19/00* (2006.01)
*H01M 8/04007* (2016.01)
*H01M 8/0432* (2016.01)
(Continued)

(52) U.S. Cl.
CPC ....... *H01M 8/04029* (2013.01); *F25B 19/005* (2013.01); *H01M 8/04067* (2013.01); *H01M 8/04358* (2013.01); *H01M 8/04417* (2013.01); *H01M 8/04768* (2013.01)

(58) Field of Classification Search
CPC ......... H01M 8/04029; H01M 8/04067; H01M 8/04358; H01M 8/04417; H01M 8/04768; H01M 8/04201; F25B 19/005
See application file for complete search history.

(56) References Cited

U.S. PATENT DOCUMENTS

| 8,263,279 B2 * | 9/2012 | Lienkamp ......... H01M 8/04007 |
| | | 429/438 |
| 2017/0291486 A1 | 10/2017 | Tanaka et al. |
| 2021/0151783 A1 * | 5/2021 | Miftakhov ........ H01M 8/04738 |

(Continued)

FOREIGN PATENT DOCUMENTS

| CN | 112242539 A | 1/2021 |
| CN | 113140754 A | 7/2021 |
| DE | 10 2015 009034 A1 | 1/2017 |

OTHER PUBLICATIONS

International Search Report and Written Opinion for PCT/US2023/012101, dated May 22, 2023 (6 pages).

*Primary Examiner* — Stewart A Fraser
(74) *Attorney, Agent, or Firm* — Umang Khanna

(57) ABSTRACT

A cooling system comprises a liquid hydrogen storage tank, a liquid hydrogen metering pump having a pump inlet in fluid communication with the liquid hydrogen storage tank, and a pump outlet, a hydrogen evaporator heat exchanger having an evaporator inlet in fluid communication with the pump outlet, and an evaporator outlet, a hydrogen gas accumulator having an accumulator inlet in fluid communication with the evaporator outlet, and an accumulator outlet, a hydrogen fuel cell system comprising at least one hydrogen fuel cell having a fuel cell inlet in fluid communication with the accumulator outlet, and a coolant circuit comprising a first coolant path disposed in thermal contact with the hydrogen evaporator heat exchanger.

15 Claims, 6 Drawing Sheets

(51) Int. Cl.
*H01M 8/0438* (2016.01)
*H01M 8/04746* (2016.01)

(56) References Cited

U.S. PATENT DOCUMENTS

2022/0009379 A1* 1/2022 Mikic ............... H01M 8/04164
2022/0093948 A1* 3/2022 Holland ................. B64D 41/00

* cited by examiner

SUPPLEMENTAL COOLING SYSTEMS FOR FUEL CELL POWERED VEHICLES WITH LIQUID HYDROGEN

FIELD OF THE INVENTION

The present disclosure relates generally to a cooling system for a vehicle, and more particularly to a supplemental cooling system utilizing liquid hydrogen for fuel cell powered vehicles.

BACKGROUND

Hydrogen fuel cells are becoming the next new innovative propulsion system and growing in popularity as the source of motive power for cars, trucks, and other vehicles. However, conventional cooling systems for internal combustion engine powered vehicles are not sufficient for fuel cell powered vehicles. In particular, thermal management for fuel cell powered vehicles is more challenging in terms of packaging and cooling air flow requirements due to various factors such as increased heat loads in combination with reduced temperature levels, additional heat sources, and more components with cooling needs.

One major challenge is heat rejection. A cooling system's required capability for a source of motive power, represented by the relation $Q/\Delta T$, is measured by a required rate of rejection of heat, Q, from the source of motive power, where the heat is rejected at a certain temperature difference, $\Delta T$, between the source of motive power and ambient air. Although fuel cell vehicles are more efficient in comparison to an equivalent internal combustion engine, fuel cell efficiency degrades throughout its lifetime and heat generation increases more rapidly than the efficiency loss. Most of the waste heat goes to the coolant and needs to be dissipated at a lower coolant temperature. However, the cooling performance of radiators is reduced because fuel cell temperature is lower than internal combustion engines. This radiator heat rejection requires cooling performance 1.5 to 2 times that of an internal combustion engine. However, the hydrogen fuel cell $\Delta T$ is typically less than half that of the internal combustion engine. This means the cooling system's required capability for hydrogen fuel cells needs to be 3 to 4 times that for internal combustion engines.

Another major challenge is coolant conductivity. Conventional coolant becomes too electrically conductive in fuel cell operation. In particular, there is ion contamination from the bipolar plates, the inner surface of the aluminum heat exchanger emits ions into the coolant, and there is coolant oxidation. If conductivity is too high, a myriad of issues may surface. Specifically, the fuel cells can be damaged via a short circuit, the stack structure of fuel cells reduces in efficiency, and there is a major concern for electrical shock hazards.

These challenges are not sufficiently addressed by conventional cooling systems because the capability of a conventional cooling system, in part, is realized by the size of the radiator(s) and the power of the fan(s) to drive the cooling air. Without a major vehicle re-design, it is very difficult, if not impossible, to re-package the radiator(s) and fan(s) for use with hydrogen fuel cells. Therefore, a need exists for a supplemental cooling system for fuel cell powered vehicles. It would be beneficial if the cooling system can meet the heat rejection requirement for most operating conditions, but can be supplemented to operate at a higher capability at higher than normal operating conditions, for example, full power and hot ambient conditions.

SUMMARY OF THE INVENTION

In one aspect of the invention, a cooling system comprises a liquid hydrogen storage tank, a liquid hydrogen metering pump having a pump inlet in fluid communication with the liquid hydrogen storage tank, and a pump outlet, a hydrogen evaporator heat exchanger having an evaporator inlet in fluid communication with the pump outlet, and an evaporator outlet, a hydrogen gas accumulator having an accumulator inlet in fluid communication with the evaporator outlet, and an accumulator outlet, a hydrogen fuel cell system comprising at least one hydrogen fuel cell having a fuel cell inlet in fluid communication with the accumulator outlet, and a coolant circuit comprising a first coolant path disposed in thermal contact with the hydrogen evaporator heat exchanger.

In another aspect of the invention, a cooling system comprises a liquid hydrogen storage tank, a liquid hydrogen metering pump having a pump inlet in fluid communication with the liquid hydrogen storage tank, and a pump outlet, a hydrogen evaporator heat exchanger having an evaporator inlet in fluid communication with the pump outlet, and an evaporator outlet, a hydrogen gas accumulator having an accumulator inlet in fluid communication with the evaporator outlet, and an accumulator outlet, a hydrogen fuel cell system comprising at least one hydrogen fuel cell having a fuel cell inlet in fluid communication with the accumulator outlet, and a coolant circuit. The coolant circuit comprises a first coolant path disposed in thermal contact with the hydrogen evaporator heat exchanger, second and third coolant paths, and a coolant regulating valve disposed within the coolant circuit upstream of the hydrogen evaporator heat exchanger, wherein the coolant regulating valve is configured to control the amount of coolant flowing through the first coolant path and flowing through the second coolant path that bypasses the hydrogen evaporator heat exchanger, wherein the first coolant path and the second coolant path join together in the third coolant path downstream of the hydrogen evaporator heat exchanger.

In a further aspect of the invention, a cooling system comprises a liquid hydrogen storage tank, a liquid hydrogen metering pump having a pump inlet in fluid communication with the liquid hydrogen storage tank, and a pump outlet, a hydrogen evaporator heat exchanger having an evaporator inlet in fluid communication with the pump outlet, and an evaporator outlet, a hydrogen gas accumulator having an accumulator inlet in fluid communication with the evaporator outlet, and an accumulator outlet, the hydrogen gas accumulator further comprising a pressure sensor and a temperature sensor for monitoring the pressure and temperature of hydrogen gas passing through the accumulator outlet, a hydrogen fuel cell system comprising at least one hydrogen fuel cell having a fuel cell inlet in fluid communication with the accumulator outlet, and a coolant circuit. The coolant circuit comprises a first coolant path disposed in thermal contact with the hydrogen evaporator heat exchanger, second and third coolant paths, and a coolant regulating valve disposed within the coolant circuit upstream of the hydrogen evaporator heat exchanger, wherein the coolant regulating valve is configured to control the amount of coolant flowing through the first coolant path and flowing through the second coolant path that bypasses the hydrogen evaporator heat exchanger, wherein the first coolant path and the second coolant path join together in the third coolant path downstream of the hydrogen evaporator heat exchanger.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope.

Figure 1:
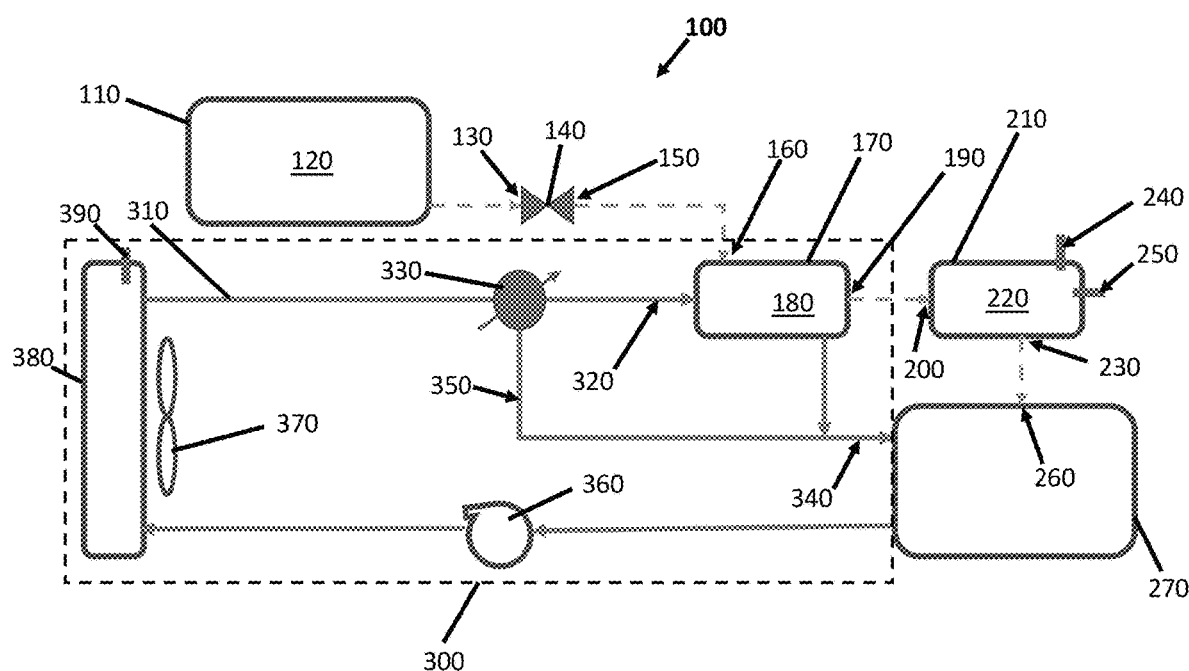
FIG. 1 is a schematic diagram of a cooling system according to an embodiment of the invention.

In the following detailed description, various embodiments are described with reference to the appended drawings. The skilled person will understand that the accompanying drawings are schematic and simplified for clarity. Like reference numerals refer to like elements or components throughout. Like elements or components will therefore not necessarily be described in detail with respect to each figure.

DETAILED DESCRIPTION

While the present invention is susceptible of embodiments in various forms, there is shown in the drawings and will hereinafter be described some exemplary and non-limiting embodiments, with the understanding that the present disclosure is to be considered an exemplification for the invention and is not intended to limit the invention to the specific embodiments illustrated. In this disclosure, the use of the disjunctive is intended to include the conjunctive. The use of the definite article or indefinite article is not intended to indicate cardinality. In particular, a reference to "the" object or "a" object is intended to denote also one of a possible plurality of such objects.

Referring now to FIG. 1, an exemplary cooling system 100 as described herein comprises a storage tank 110 containing liquid hydrogen 120, a metering pump 140, an evaporator 170, an accumulator 210, and a coolant circuit 300. The storage tank 110, metering pump 140, evaporator 170, and accumulator 210 are connected by conduits or piping as is known in the art through which hydrogen flows in the direction of the arrows as shown generally left to right and top to bottom on FIG. 1. The arrangement of components as described above and as shown in FIG. 1 utilizes the heat of vaporization of liquid hydrogen and the sensible heat of hydrogen to provide cooling for the coolant circuit 300, which is used ultimately to provide supplemental cooling as needed for a source of motive power 270, for example, one or more hydrogen fuel cells 270, and alternatively, additional components requiring cooling as will be described more fully hereinbelow. In an embodiment, the fuel cell system 270 comprises at least one hydrogen fuel cell. In an embodiment the fuel cell system 270 comprises another source of motive power that requires cooling.

Still referring to FIG. 1, in an embodiment, the coolant circuit 300 comprises a coolant regulating value 330, a coolant pump 360, and a coolant radiator 380 arranged in a circuit of conduits or piping in which a coolant 310 flows in the direction of the arrows as shown generally clockwise in FIG. 1. A cooling fan 370 is optionally included in proximity to the radiator 380 to provide forced air convective cooling to the radiator 380. In an embodiment, the coolant regulating valve 330 is disposed between the coolant radiator 380 and the hydrogen evaporator 170. The coolant regulating valve 330 controls the amount of coolant 310 that flows from the coolant radiator 380 to the hydrogen evaporator 170 through a first coolant path 320.

The hydrogen evaporator 170 receives heat from the coolant 310. Heat thus transferred to the hydrogen evaporator 170 evaporates liquid hydrogen therein to produce hydrogen gas 180. The transfer of heat from the coolant 310 to the hydrogen evaporator 170 therefore cools the coolant 310 while concurrently changing the liquid phase hydrogen 120 to gas phase hydrogen 180 that can be accepted by the hydrogen fuel cell system 270, which is comprised of one or more hydrogen fuel cells. When needed, the coolant 310 within the coolant circuit 300 is brought into thermal contact with the hydrogen fuel cell system 270 to provide supplemental cooling as needed for the hydrogen fuel cell system 270.

The size of the storage tank 110, or volume of the liquid hydrogen 120 and/or the coolant 310, can be determined based on the duty cycle of the vehicle on which the system is installed and the geographic location of the operating vehicle. In an embodiment, the coolant 310 is a conventional type of coolant, for example without limitation, ethylene glycol or other known coolant. In an embodiment, the coolant 310 comprises a conventional type of coolant, for example without limitation, ethylene glycol or other known coolant mixed with other kinds of coolant. In other embodiments, the coolant 310 is another sort of coolant, for example without limitation as is used in cooling systems as is known in the art, or a combination of multiple other sorts of coolants.

In the absence of the evaporator 170, for example, when the regulating valve 330 directs the coolant 310 to bypass the evaporator 170 as described hereinbelow, the coolant 310 is cooled by the ambient air, and so cannot be colder than the ambient air. However, when the regulating valve 330 is directing at least a portion the coolant 310 toward the evaporator 170, the coolant 310, for example exiting the evaporator 170, can be colder than the ambient air.

Referring again to FIG. 1, in an embodiment, the metering pump 140 pumps liquid hydrogen 120 through a metering pump inlet 130 and a metering pump outlet 150 to the hydrogen evaporator 170 through a hydrogen evaporator inlet 160. Gas phase hydrogen 180 generated within the evaporator 170 flows through a hydrogen evaporator outlet 190 and a hydrogen accumulator inlet 200 into the accumulator 210, wherein hydrogen gas 220 is accumulated. In an embodiment, the hydrogen gas 220 flows through an accumulator outlet 230 to a fuel cell system inlet 260, providing hydrogen gas 220 as fuel for the hydrogen fuel cell system 270 comprised of one or more hydrogen fuel cells.

In an embodiment, a pressure sensor 240 and a first temperature sensor 250 are disposed in or on the accumulator 210 to monitor the pressure and temperature of the hydrogen gas 220 flowing through the accumulator outlet 230. In an embodiment, the hydrogen evaporator 170 is a liquid-to-liquid or liquid-to-vapor heat exchanger. In an embodiment, the hydrogen gas accumulator 210 is manufactured of material compatible to support the temperature and pressure required by the fuel cell system 270, such as a metal tank or other similar materials able to support and withstand the required temperature and pressure.

Referring again to FIG. 1, in an embodiment, the coolant regulating valve 330 also regulates part of coolant 310 through a second coolant path 350, bypassing the hydrogen evaporator 170, wherein the first coolant path 320 and the second coolant path 350 join in a third coolant path 340 flowing to the fuel cell system 270. Because the evaporator 170 is required to continuously operate to provide hydrogen gas 180 for the fuel cell system 270, in an embodiment the regulating valve 330 is controlled in such a way to provide sufficient coolant to vaporize the liquid phase hydrogen 120.

In an embodiment, a second temperature sensor 390 is disposed near the radiator 380, or alternatively, in thermal contact with the coolant 310 flowing through the coolant circuit 300, for example, at an outlet side of the radiator 380. In an embodiment, the pressure sensor 240, the first temperature sensor 250, and the second temperature sensor 390 are in electrical communication with a control system as is known in the art for the coolant circuit 300, including the coolant regulating valve 330. In an embodiment the temperature of the coolant 310 at the outlet of the radiator 380 as measured by the second temperature sensor 390 is compared to a predetermined maximum operating temperature.

In an embodiment, if the measured temperature of the coolant 310 at the outlet of the radiator 380 is less than the predetermined maximum operating temperature, the coolant 310 does not require further cooling, so the regulating valve 330 limits flow of the coolant 310 to the evaporator 170 to meet the need for producing hydrogen gas 180 for the fuel cell system 270. However, if the measured temperature of the coolant 310 at the outlet of the radiator 380 is greater than the predetermined maximum operating temperature, the coolant regulating valve 330 allows a larger portion of the flow of the coolant 310 to flow to the evaporator 330 for additional cooling that is derived from passing through the evaporator 170. Additional hydrogen gas 180 produced by cooling the larger portion of the coolant 310 is stored in the accumulator 210.

In other embodiments, the coolant regulating valve 330 is always partly open to allow coolant 310 to flow to the evaporator 170 to meet the need for producing hydrogen gas 180 for the fuel cell system 270, and the proportion of coolant 310 diverted to the evaporator 170 is adjusted as needed to maintain the temperature of the coolant 310 at or below the maximum operating temperature. In an embodiment, the cooling fan 370 assists in the shedding of waste and/or excess heat from the radiator 380. In an embodiment, the cooling fan 370 can be either mechanical or electric.

Figure 2:
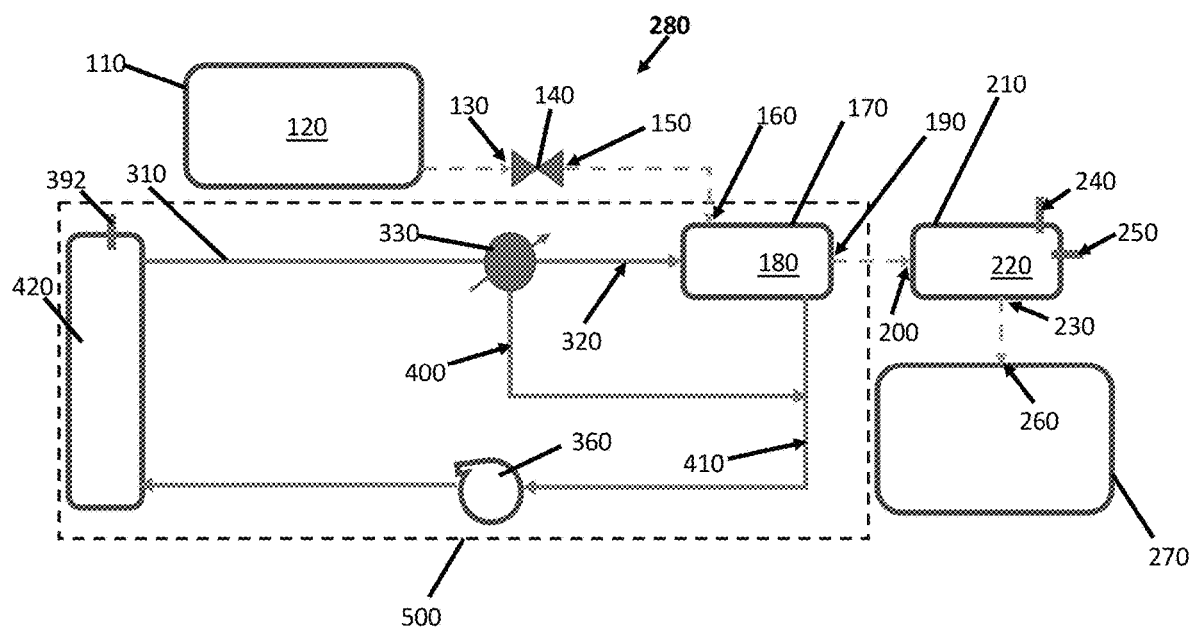
FIG. 2 is a schematic diagram of a cooling system according to another embodiment of the invention.

Referring now to FIG. 2, in an embodiment, a coolant circuit 500 comprises one or more power batteries 420 instead of the coolant radiator 380 of the coolant circuit 300 shown in FIG. 1. An exemplary battery cooling system 280 as described herein comprises the storage tank 110 containing the liquid hydrogen 120, the metering pump 140, the evaporator 170, the accumulator 210, and the coolant circuit 500. The storage tank 110, metering pump 140, evaporator 170, and accumulator 210 are connected by conduits or piping as is known in the art through which hydrogen flows in the direction of the arrows as shown on FIG. 2. The arrangement of components as described above and as shown in FIG. 2 utilizes the heat of vaporization of liquid hydrogen and the sensible heat of hydrogen to provide cooling for the coolant circuit 500 including the one or more power batteries 420. In other embodiments as further explained below, combined cooling systems are also possible, wherein such combined systems are capable of providing cooling to two or more components.

Still referring to FIG. 2, in an embodiment, the coolant circuit 500 comprises the coolant regulating value 330, the coolant pump 360, and the one or more power batteries 420 arranged in a circuit of conduits or piping in which the coolant 310 flows in the direction of the arrows as shown generally clockwise in FIG. 2. In an embodiment, the coolant regulating valve 330 is disposed between the one or more power batteries 420 and the hydrogen evaporator 170. In an embodiment, an additional temperature sensor 392 is disposed in or on the housing of the one or more batteries 420, or alternatively, in thermal contact with the coolant flowing through the housing of the one or more batteries 420, for example, at an outlet side of the housing of the one or more batteries 420. In an embodiment, the pressure sensor 240, the temperature sensors 250 and 392, and the valve 330, are in electrical communication with a control system as is known in the art for the coolant circuit 500.

The coolant regulating valve 330, for example under the control of the control system electrically connected with the additional temperature sensor 392, controls the amount of coolant 310 that flows from the one or more power batteries 420 to the hydrogen evaporator 170 through a first coolant path 320. In an embodiment, the coolant regulating valve 330 also regulates coolant 310 through a second coolant path 400, bypassing the hydrogen evaporator 170, wherein the first coolant path 320 and the second coolant path 400 join in a third coolant path 410 flowing to the one or more power batteries 420, thereby cooling the one or more power batteries 420.

The coolant circuit 500 illustrated as part of the battery cooling system 280 in FIG. 2 does not make thermal contact with the fuel cell system 270. However, in other embodiments described below, at least elements of the coolant circuit 500 can be combined with or integral to the coolant circuit 300 that is in thermal contact with the fuel cell system 270. In an embodiment the third coolant path 410 flows via a conduit through a housing of the one or more power batteries 420; however, in other embodiments the third coolant path 410 flows via a conduit, for example, that wraps around and/or through the housing, or is configured to be in thermal contact with the housing in any configuration as is known for a conduit of coolant used to cool the housing or the contents of the housing.

Figure 3:
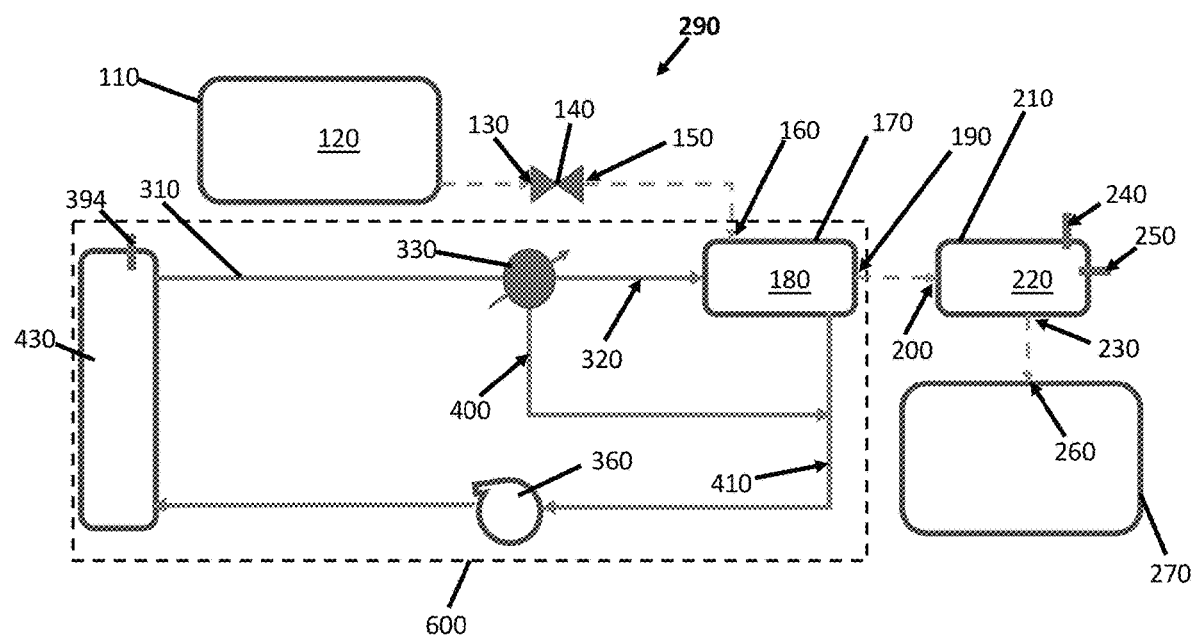
FIG. 3 is a schematic diagram of a cooling system according to a further embodiment of the invention.

Referring now to FIG. 3, in an embodiment, a coolant circuit 600 comprises an air chiller 430 instead of the coolant radiator 380 of the coolant circuit 300 shown in FIG. 1 or the one or more power batteries 420 of the coolant circuit 500 shown in FIG. 2. An exemplary air chiller cooling system 290 as described herein comprises the storage tank 110 containing the liquid hydrogen 120, the metering pump 140, the evaporator 170, the accumulator 210, and the coolant circuit 600. The storage tank 110, metering pump 140, evaporator 170, and accumulator 210 are connected by conduits or piping as is known in the art through which hydrogen flows in the direction of the arrows as shown on FIG. 3. The arrangement of components as described above and as shown in FIG. 3 utilizes the heat of vaporization of liquid hydrogen and the sensible heat of hydrogen to provide cooling for the coolant circuit 600 including the air chiller 430. The air chiller 430 can be used, for example, for vehicle cabin air chilling, thereby replacing a conventional air conditioner. In other embodiment as further explained below, a combined cooling system is also possible, wherein such a combined system combines elements of the coolant circuit 300 of FIG. 1 and the coolant circuit 600 of FIG. 3 into a combined circuit.

Still referring to FIG. 3, in an embodiment, the coolant circuit 600 comprises the coolant regulating value 330, the coolant pump 360, and the air chiller 430 arranged in a circuit of conduits or piping in which the coolant 310 flows in the direction of the arrows generally clockwise as shown in FIG. 3. In an embodiment, the coolant regulating valve 330 is disposed between the air chiller 430 and the hydrogen evaporator 170. In an embodiment, an additional temperature sensor 394 is disposed in or on the housing of the air chiller 430, or alternatively, in thermal contact with the coolant flowing through the housing of the air chiller 430, for example, at an outlet side of the housing of the air chiller 430. In an embodiment, the pressure sensor 240, the temperature sensors 250 and 394, and the valve 330, are in electrical communication with a control system as is known in the art for the coolant circuit 600.

The coolant regulating valve 330, for example under the control of the control system electrically connected with the additional temperature sensor 394, controls the amount of coolant 310 that flows from the air chiller 430 to the hydrogen evaporator 170 through a first coolant path 320. In an embodiment, the coolant regulating valve 330 also regulates coolant 310 through a second coolant path 400, bypassing the hydrogen evaporator 170, wherein the first coolant path 320 and the second coolant path 400 join in a third coolant path 410 flowing to the air chiller 430, thereby cooling the air chiller 430.

The coolant circuit 600 illustrated as part of the air chiller cooling system 290 in FIG. 3 does not make thermal contact with the fuel cell system 270. However, in other embodiments described below, the coolant circuit 600 can be combined with or integral to the coolant circuit 300 that is in thermal contact with the fuel cell system 270. In an embodiment the third coolant path 410 flows via a conduit through a housing of the air chiller 430; however, in other embodiments the third coolant path 410 flows via a conduit, for example, that wraps around and/or through the housing, or is configured to be in thermal contact with the housing in any configuration as is known for a conduit of coolant used to cool the housing or the contents of the housing.

Figure 4:
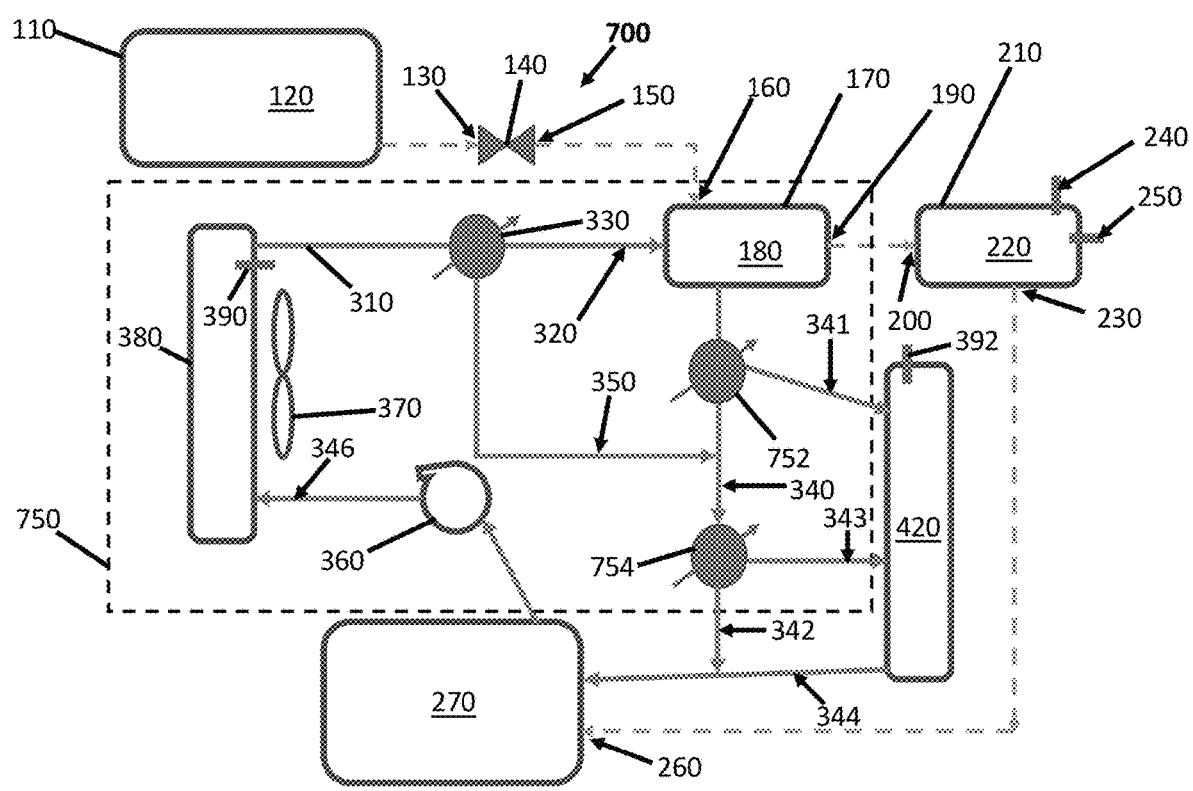
FIG. 4 is a schematic diagram of a first combined cooling system for cooling one or more power batteries and a source of motive power, according to an embodiment of the invention.

Referring now to FIG. 4, in an embodiment, a coolant circuit 750 comprises both the coolant radiator 380 of the coolant circuit 300 shown in FIG. 1 and additional conduits and valves, to provide cooling, for example, for cooling the one or more power batteries 420 of the coolant circuit 500 shown in FIG. 2 and the fuel cell system 270. In embodiments wherein the one or more power batteries 420 are included with other components, it is preferable but not required that the one or more power batteries 420 are arranged closest to the hydrogen evaporator 170 or as the first component in the third path 340 carrying coolant from the hydrogen evaporator 170. This is because the temperature required for the coolant 310 is much lower to cool the one or more power batteries 420 than the temperature required to cool the fuel cell system 270 or other components.

For example, still referring to FIG. 4, an exemplary first combined cooling system 700 comprises all of the same elements external to the coolant circuit 750 as the cooling systems 100, 280, 290 described hereinabove. The embodiment of the coolant circuit 750 includes some additional conduits and valves not present in the prior embodiments of the coolant circuit 300, 500, 600 described hereinabove.

For example, a primary selector valve 752 is disposed immediately downstream of the evaporator 170. The coolant 310 exiting from the evaporator 170 is colder than at any other point in the coolant loop 750. The primary selector valve 752 regulates how much of the coolant 310 is directed to the one or more batteries 420 via the conduit 341 and how much of the coolant 310 is directed to join with the second coolant path 350 to define the third coolant path 340. Coolant 310 exiting the one or more batteries 420 flows via the conduit 344 toward the fuel cell system 270.

In this embodiment, a secondary selector valve 754 is disposed in the third coolant path 340 to control the amount of coolant 310 flowing to the one or more power batteries 420 via the conduit 343 and the amount of coolant 310 bypassing the one or more power batteries 420 and directed toward the fuel cell system 270 via conduit 342. Thus, the primary and secondary selector valves 752, 754 allows the first combined cooling system 700 to route the coolant 310 into thermal contact with the one or more batteries in either or both of two ways, or through the coolant circuit 750 entirely excluding the one or more power batteries 420. After the fuel cell system 270, the coolant 310 passes to the radiator 380 via the pump 360 and the conduit 346.

In an embodiment, the additional temperature sensor 392 is disposed in or on the housing of the one or more power batteries 420, or alternatively, in thermal contact with the coolant flowing through the housing of the one or more power batteries 420, for example, at an outlet side of one or more power batteries 420.

In an embodiment, the pressure sensor 240, the temperature sensors 250, 390, and 392, and the valves 330, 752, and 754, are in electrical communication with a control system as is known in the art for the coolant circuit 750 and the first combined cooling system 700. Depending on the cooling needs of the one or more power batteries 420, the primary and secondary selector valves 752 and 754, for example under the control of the control system electrically connected with the additional temperature sensor 392, diverts at least a portion of the coolant 310 towards the one or more power batteries 420 via either or both of the conduits 341 and 343 with the rest of the coolant 310 passing to the fuel cell system 270 via the conduit 342.

Figure 5:
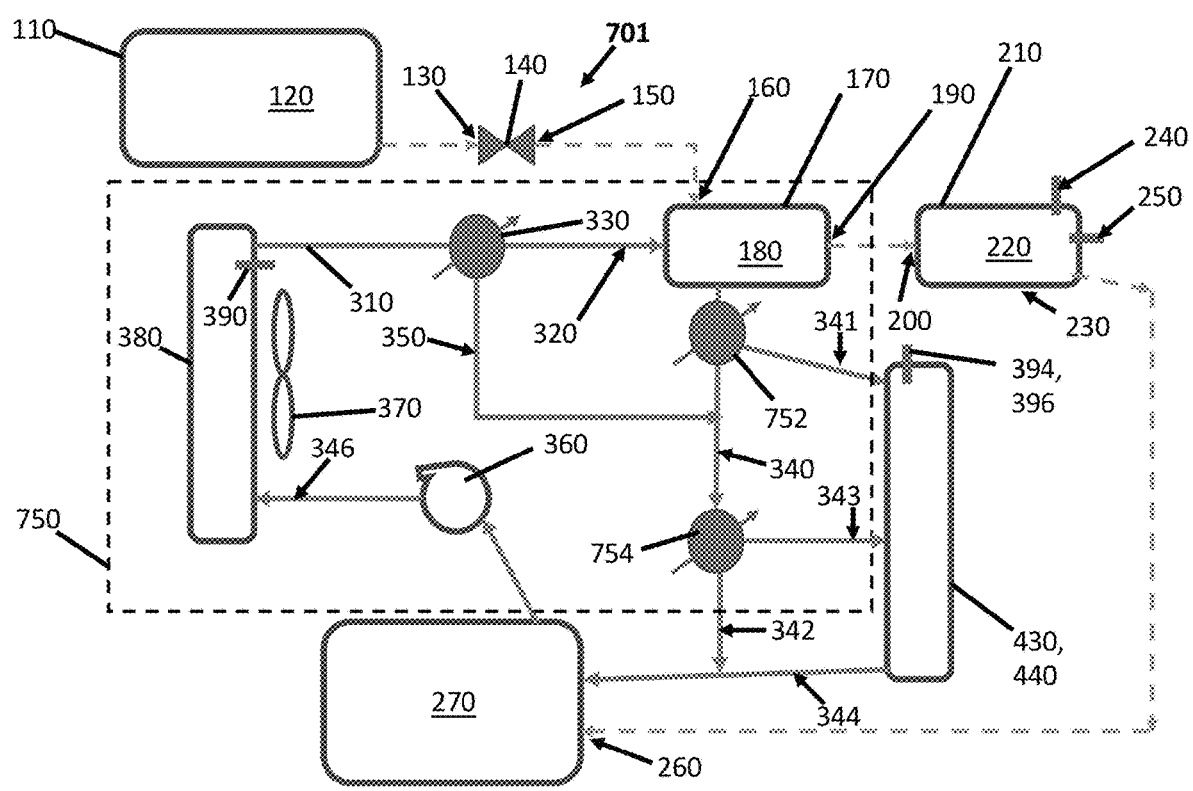
FIG. 5 is a schematic diagram of a second combined cooling system for cooling a source of motive power, an air chiller, and/or one or more additional components, according to an embodiment of the invention.

Referring now to FIG. 5, in an embodiment, an exemplary second combined cooling system 701 comprises the coolant circuit 750 but is utilized to provide cooling, for example, for the air chiller 430 of the coolant circuit 600 shown in FIG. 3, the fuel cell system 270, and/or one or more other components 440 that require cooling. The one or more other components in various embodiments include autonomous driving systems, onboard navigation systems, collision avoidance systems, gaming or video entertainment systems, or any other onboard system that requires cooling.

Still referring to FIG. 5, the exemplary second combined cooling system 701 comprises all of the same elements external to the coolant circuit 750 as the cooling systems 100, 280, 290, 700 described hereinabove. However, in this embodiment the primary selector valve 752 regulates how much of the coolant 310 is directed to the air chiller 430 and/or one or more other components 440 via the conduit 341 and how much of the coolant 310 is directed join with the second coolant path 350 to define the third coolant path 340. Coolant 310 exiting the air chiller 430 and/or one or more other components 440 flows via the conduit 344 toward the fuel cell system 270.

In this embodiment, the secondary selector valve 754 is disposed in the third coolant path 340 to control the amount of coolant 310 flowing to the air chiller 430 and/or one or more other components 440 via the conduit 343 and the amount of coolant 310 bypassing the air chiller 430 and/or one or more other components 440 and directed toward the fuel cell system 270 via conduit 342. Thus, the primary and secondary selector valves 752, 754 allows the second combined cooling system 701 to route the coolant 310 into thermal contact with the air chiller 430 and/or one or more other components 440 in either or both of two ways, or through the coolant circuit 750 entirely excluding the air chiller 430 and/or one or more other components 440.

In an embodiment, additional temperature sensors 394, 396 are disposed in or on the housing of the air chiller 430 and/or the one or more other components 440, respectively, or alternatively, in thermal contact with the coolant flowing through the housing of the air chiller 430 and/or the one or more other components 440, for example, at an outlet side of the air chiller 430 and/or the one or more other components 440, respectively.

In an embodiment, the pressure sensor 240, the temperature sensors 250, 390, 394, and 396, and the valves 330, 752, and 754, are in electrical communication with a control system as is known in the art for the coolant circuit 750 and the second combined cooling system 701. Depending on the cooling needs of the air chiller 430 and/or the one or more other components 440, the primary and secondary selector valves 752 and 754, for example under the control of the control system electrically connected with the additional temperature sensors 394, 396, diverts at least a portion of the coolant 310 towards the air chiller 430 and/or the one or more other components 440 via either or both of the conduits 341 and 343 with the rest of the coolant 310 passing to the fuel cell system 270 via the conduit 342.

Figure 6:
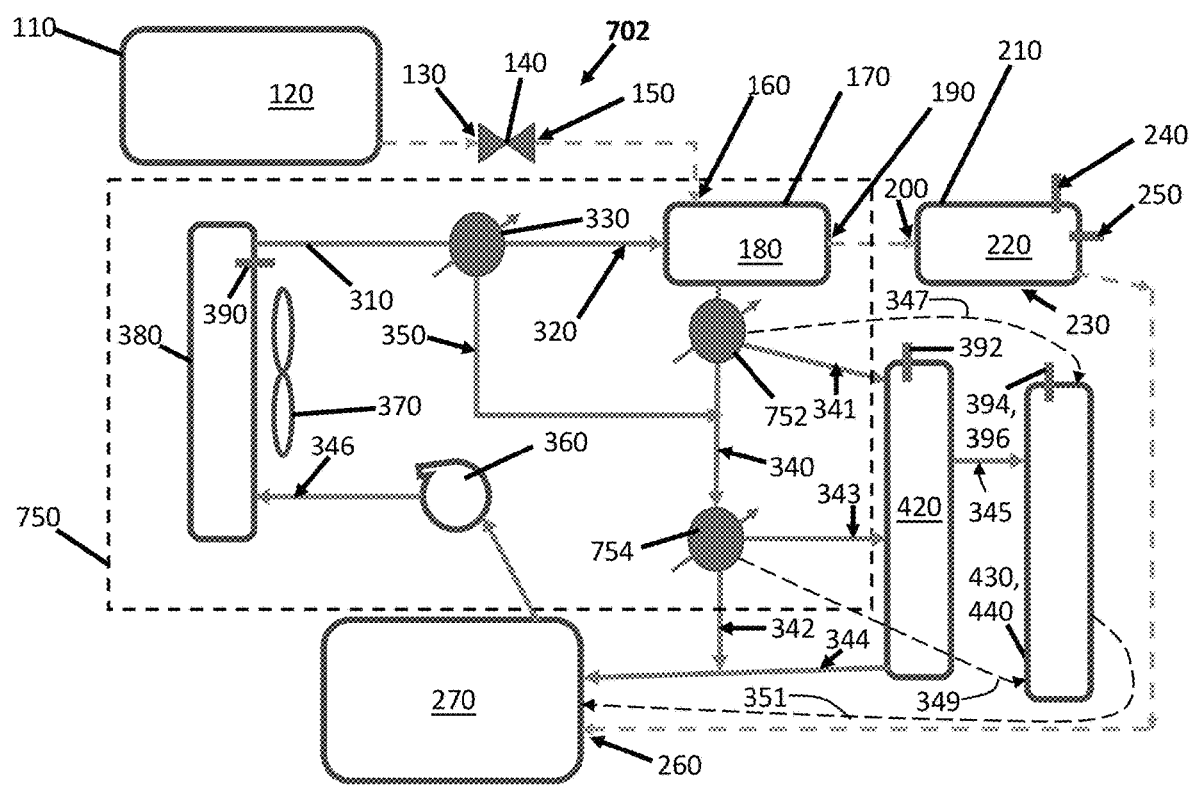
FIG. 6 is a schematic diagram of a third combined cooling system for cooling a source of motive power, one or more power batteries, an air chiller, and/or one or more additional components, according to another embodiment of the invention.

Referring now to FIG. 6, in an embodiment, an exemplary third combined cooling system 702 again comprises the coolant circuit 750 but is utilized to provide cooling, for example, for the one or more power batteries 420, the air chiller 430, the fuel cell system 270, and/or one or more other components 440 that require cooling. The one or more other components in various embodiments include autonomous driving systems, onboard navigation systems, collision avoidance systems, gaming or video entertainment systems, or any other onboard system that requires cooling.

Still referring to FIG. 6, the exemplary third combined cooling system 702 comprises all of the same elements external to the coolant circuit 750 as the cooling systems 100, 280, 290, 700, 701 described hereinabove. FIG. 6 is illustrative of a plurality of different configurations of components configured in both series and/or parallel coolant flows.

For example, in a first series embodiment, the primary selector valve 752 regulates how much of the coolant 310 is directed to the one or more power batteries 420, the air chiller 430 and/or one or more other components 440 arranged in series via the conduit 341 and how much of the coolant 310 is directed to join with the second coolant path 350 to define the third coolant path 340. In the first series embodiment, the coolant 310 passes from the one or more power batteries 420 to the air chiller 430 and/or one or more other components 440 via the conduit 345. After passing into thermal contact with the air chiller 430 and/or the one or more additional components 440 in any serial order, the coolant 310 passes into thermal contact with the fuel cell system 270 via the conduit 351.

In this embodiment, the secondary selector valve 754 is disposed in the third coolant path 340 to control the amount of coolant 310 flowing to the one or more power batteries 420, the air chiller 430 and/or one or more other components 440 via the conduit 343 and the amount of coolant 310 bypassing the one or more power batteries 420, the air chiller 430 and/or one or more other components 440 and directed toward the fuel cell system 270 via conduit 342. Coolant 310 passed through the conduit 343 via the secondary selector valve 754 in the first serial embodiment follows the same path as described hereinabove for the coolant 310 passing through the conduit 341 via the primary selector valve 752.

In a first parallel embodiment, for example, the primary selector valve 752 regulates how much of the coolant 310 is directed to the one or more power batteries 420, the air chiller 430, and/or one or more other components 440 arranged in parallel via the conduits 341 and 347 (and additional conduits in parallel to 347 as needed, for example, for the air chiller 430 and/or one or more other components 440) and how much of the coolant 310 is directed to join with the second coolant path 350 to define the third coolant path 340. In the first parallel embodiment, after passing into thermal contact with any of the one or more power batteries 420, the air chiller 430, and/or the one or more additional components 440, the coolant 310 passes into thermal contact with the fuel cell system 270 via the conduits 344 and 351 (and additional conduits in parallel to 351 as needed, for example, for the air chiller 430 and/or one or more other components 440).

In this embodiment, the secondary selector valve 754 is disposed in the third coolant path 340 to control the amount of coolant 310 flowing to the one or more power batteries 420, the air chiller 430, and/or one or more other components 440 via the conduits 343 and 349 (and additional conduits in parallel to 349 as needed, for example, for the air chiller 430 and/or one or more other components 440) and the amount of coolant 310 bypassing the one or more power batteries 420, the air chiller 430 and/or one or more other components 440 and directed toward the fuel cell system 270 via conduit 342. Coolant 310 passed through the conduits 343 and 349 (and additional conduits in parallel to 349 as needed, for example, for the air chiller 430 and/or one or more other components 440) via the secondary selector valve 754 in the first parallel embodiment follows the same path as described hereinabove for the coolant 310 passing through the conduits 344 and 351 (and additional conduits in parallel to 351 as needed, for example, for the air chiller 430 and/or one or more other components 440) via the primary selector valve 752.

In an embodiment, the pressure sensor 240, the temperature sensors 250, 390, 392, 394, and 396, and the valves 330, 752, and 754, are in electrical communication with a control system as is known in the art for the coolant circuit 750 and the third combined cooling system 702. Depending on the cooling needs of any of the components illustrated in FIG. 6, the primary and secondary selector valves 752 and 754, for example under the control of the control system electrically connected with the additional temperature sensors 392, 394, 396, diverts at least a portion of the coolant 310 towards the one or more power batteries 420, the air chiller 430 and/or the one or more other components 440 via either or both of the conduits 341 and 343 with the rest of the coolant 310 passing to the fuel cell system 270 via the conduit 342.

FIG. 6 is also illustrative of combinations of serial and parallel coolant flow connections of the one or more power batteries 420, the air chiller 430 and/or the one or more other components 440. For example, one or more of a plurality of components could be connected in series with two or more other components that are connected in parallel with each other. Or, one or more of a plurality of components could be connected in parallel with two or more other components that are connected in series with each other. So to reiterate, when the one or more power batteries 420, the air chiller 430 and/or the one or more other components 440 are present together in a combined cooling system, the configuration of arrangement of the one or more power batteries 420, the air chiller 430, and the one or more other components 440 can be serial or parallel in the context of the flow of the coolant 310, and the order of arrangement of the one or more power batteries 420, the air chiller 430, and the one or more other components 440 relative to the flow of the coolant 310 can be in any order as desired or needed, and all such possible orders are represented by the diagrams in FIGS. 4-6. In an embodiment, the cooling systems 100, 280, 290, 700, 701, and 702 are used in a method for cooling the fuel system 270, for example without limitation one or more hydrogen fuel cells.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity. Unless otherwise noted, the use of the words "approximate," "about," "around," "substantially," etc., mean plus or minus ten percent.

INDUSTRIAL APPLICABILITY

Embodiments of the cooling system as described hereinabove provide for supplemental cooling for a vehicle powered by an alternative source of motive power such as, for example, one or more hydrogen fuel cells without requiring a major redesign of the vehicle to accommodate the cooling system. The cooling system can be manufactured in industry for use in vehicles powered by hydrogen fuel cells.

Numerous modifications to the present invention will be apparent to those skilled in the art in view of the foregoing description. It is not desired to limit the invention to the exact construction and operation shown and described, and accordingly, all suitable modifications and equivalents may be resorted to, falling within the scope of the invention. Accordingly, this description is to be construed as illustrative only of the principles of the invention and is presented for the purpose of enabling those skilled in the art to make and use the invention and to teach the best mode of carrying out same. The exclusive rights to all modifications which come within the scope of the appended claims are reserved. All patents, patent publications and applications, and other references cited herein are incorporated by reference herein in their entirety.

We claim:

1. A cooling system, comprising:
a liquid hydrogen storage tank;
a liquid hydrogen metering pump having a pump inlet in fluid communication with the liquid hydrogen storage tank, and a pump outlet;
a hydrogen evaporator heat exchanger having an evaporator inlet in fluid communication with the pump outlet, and an evaporator outlet;
a hydrogen gas accumulator having an accumulator inlet in fluid communication with the evaporator outlet, and an accumulator outlet;
a hydrogen fuel cell system comprising at least one hydrogen fuel cell having a fuel cell inlet in fluid communication with the accumulator outlet; and
a coolant circuit comprising a first coolant path disposed in thermal contact with the hydrogen evaporator heat exchanger;
the coolant circuit further comprising second and third coolant paths and a coolant regulating valve disposed within the coolant circuit upstream of the hydrogen evaporator heat exchanger, wherein the coolant regulating valve is configured to control the amount of coolant flowing through the first coolant path and flowing through the second coolant path, that bypasses the hydrogen evaporator heat exchanger, wherein the first coolant path and the second coolant path join together in the third coolant path downstream of the hydrogen evaporator heat exchanger.

2. The cooling system of claim 1, wherein the hydrogen gas accumulator further comprises a pressure sensor and a temperature sensor for monitoring the pressure and temperature of hydrogen gas passing through the accumulator outlet.

3. The cooling system of claim 1, wherein the coolant circuit further comprises a coolant pump disposed within the coolant circuit for pumping coolant around the coolant circuit, and a coolant radiator disposed within the coolant circuit.

4. The cooling system of claim 3, wherein the third path is in thermal contact with the hydrogen fuel cell system, thereby cooling the hydrogen fuel cell system.

5. The cooling system of claim 3, wherein the third path is in thermal contact with one or more batteries, thereby cooling the one or more batteries.

6. The cooling system of claim 3, wherein the third path is in thermal contact with an air chiller, thereby cooling air flowing through the air chiller.

7. A cooling system, comprising:
a liquid hydrogen storage tank;
a liquid hydrogen metering pump having a pump inlet in fluid communication with the liquid hydrogen storage tank, and a pump outlet;
a hydrogen evaporator heat exchanger having an evaporator inlet in fluid communication with the pump outlet, and an evaporator outlet;
a hydrogen gas accumulator having an accumulator inlet in fluid communication with the evaporator outlet, and an accumulator outlet;
a hydrogen fuel cell system comprising at least one hydrogen fuel cell having a fuel cell inlet in fluid communication with the accumulator outlet; and
a coolant circuit comprising:
a first coolant path disposed in thermal contact with the hydrogen evaporator heat exchanger;
second and third coolant paths; and
a coolant regulating valve disposed within the coolant circuit upstream of the hydrogen evaporator heat exchanger, wherein the coolant regulating valve is configured to control the amount of coolant flowing through the first coolant path and flowing through the second coolant path that bypasses the hydrogen evaporator heat exchanger, wherein the first coolant path and the second coolant path join together in the third coolant path downstream of the hydrogen evaporator heat exchanger.

8. The cooling system of claim 7, wherein the hydrogen gas accumulator further comprises a pressure sensor and a temperature sensor for monitoring the pressure and temperature of hydrogen gas passing through the accumulator outlet.

9. The cooling system of claim 7, wherein the coolant circuit further comprises a coolant pump disposed within the coolant circuit for pumping coolant around the coolant circuit, and a coolant radiator disposed within the coolant circuit.

10. The cooling system of claim 9, wherein the third coolant path is in thermal contact with the hydrogen fuel cell system, thereby cooling the hydrogen fuel cell system.

11. The cooling system of claim 9, wherein the third coolant path is in thermal contact with one or more batteries, thereby cooling the one or more batteries.

12. The cooling system of claim 9, wherein the third coolant path is in thermal contact with an air chiller, thereby cooling air flowing through the air chiller.

13. The cooling system of claim 9, wherein the third coolant path is in thermal contact with at least one of one or more batteries and an air chiller, thereby cooling the at least one of the one or more batteries and the air chiller.

14. The cooling system of claim 9, wherein the third path is in thermal contact with an additional component selected from the group of additional components consisting of an autonomous driving system, onboard navigation system, collision avoidance system, gaming or video entertainment system, or any other onboard system that requires cooling, thereby cooling the additional component.

15. The cooling system of claim 9, wherein the third path is the coolant circuit between the hydrogen evaporator heat exchanger and the hydrogen fuel cell system.

\* \* \* \* \*